United States Patent
Francalanci et al.

(10) Patent No.: US 8,081,605 B2
(45) Date of Patent: Dec. 20, 2011

(54) METHOD FOR ASSIGNING SCRAMBLING CODES IN A CDMA CELLULAR MOBILE COMMUNICATIONS NETWORK

(75) Inventors: Indro Francalanci, Turin (IT); Massimiliano Panico, Turin (IT)

(73) Assignee: Telecom Italia S.p.A., Milan (IT)

( * ) Notice: Subject to any disclaimer, the term of this patent is extended or adjusted under 35 U.S.C. 154(b) by 793 days.

(21) Appl. No.: 11/791,987

(22) PCT Filed: Dec. 1, 2004

(86) PCT No.: PCT/EP2004/053210
§ 371 (c)(1),
(2), (4) Date: Mar. 13, 2008

(87) PCT Pub. No.: WO2006/058562
PCT Pub. Date: Jun. 8, 2006

(65) Prior Publication Data
US 2008/0268856 A1    Oct. 30, 2008

(51) Int. Cl.
*H04B 7/216* (2006.01)
(52) U.S. Cl. .................. 370/335; 455/446
(58) Field of Classification Search .......... None
See application file for complete search history.

(56) References Cited

U.S. PATENT DOCUMENTS

| | | | |
|---|---|---|---|
| 2003/0099357 A1* | 5/2003 | Ryu et al. | 380/252 |
| 2004/0202140 A1* | 10/2004 | Kim et al. | 370/335 |
| 2006/0268808 A1* | 11/2006 | Kang | 370/342 |
| 2007/0249340 A1* | 10/2007 | Hiltunen et al. | 455/433 |

FOREIGN PATENT DOCUMENTS

EP    1 152 628 A1    11/2001
WO    WO-99/22475    5/1999

OTHER PUBLICATIONS

S. Kourtis, "Code Planning Strategy for UMTS—FDD Networks", Proceedings of VTC 2000, Tokyo, 5 pages, 2000.
Jung et al.; "Scrambling Code Planning for 3GPP W-CDMA Systems"; IEEE VTS 53$^{RD}$ Vehicular Technology Conference, vol. 4 of, Conf. 53, pp. 2431-2434, (2001).

* cited by examiner

*Primary Examiner* — Kevin C Harper
*Assistant Examiner* — Rhonda Murphy
(74) *Attorney, Agent, or Firm* — Finnegan, Henderson, Farabow, Garrett & Dunner, L.L.P.

(57) ABSTRACT

A method of assigning scrambling codes to cells of a CDMA cellular mobile communications network includes assigning to each cell of a set of cells of a network area a cell attribute adapted to identify a cell typology, and, for each cell, assigning a respective primary scrambling code according to the cell typology, exploiting said cell attribute. The cell attribute includes a first attribute value adapted to identify a cell in which a complexity of computation to be performed by the user equipment for determining the cell primary scrambling code is to be minimized, and a second attribute value adapted to identify a cell in which a synchronization time of mobile communications user equipment is to be minimized. If the cell has an attribute value equal to said first attribute, the cell is assigned a primary scrambling code different from the primary scrambling codes assigned to neighboring cells. If the cell has an attribute value equal to said second attribute, the cell is assigned a primary scrambling code not belonging to a code group to which a primary scrambling code assigned to a neighboring cell belongs.

9 Claims, 5 Drawing Sheets

(1ST OF 3)

(2ND OF 3)

(3RD OF 3)

METHOD FOR ASSIGNING SCRAMBLING CODES IN A CDMA CELLULAR MOBILE COMMUNICATIONS NETWORK

CROSS REFERENCE TO RELATED APPLICATION

This application is a national phase application based on PCT/EP2004/053210, filed Dec. 1, 2004, the content of which is incorporated herein by reference.

FIELD OF THE INVENTION

The present invention generally relates to the field of telecommunications, particularly to mobile communications networks, allowing communications between mobile users. More specifically, the invention relates to cellular mobile communications networks that adopt a Code Division Multiple Access (CDMA) access scheme, such as cellular networks of the third generation.

BACKGROUND OF THE INVENTION

A peculiarity of cellular mobile communications networks is that they feature a plurality of so-called "network cells", where by the term cell there is intended the set of geographical points ("pixels", in jargon) covered by the radio electromagnetic signal irradiated by a common antenna. Cellular mobile communications networks thus provide coverage of a determined geographic region by means of the plurality of network cells.

Among the different type of cellular mobile communications networks, some networks have a radio access front end exploiting the CDMA access scheme to the shared (radio) communication medium. This is for example the case of third-generation cellular mobile communications networks, currently starting to be deployed. One of the third-generation mobile communications standards is the so-called Universal Mobile Telecommunications System (UMTS), which is in particular the standard that has been adopted by operators in Europe.

CDMA is a technique of accessing a shared communications medium according to which a same frequency bandwidth (a "channel") is assigned simultaneously to all the requesting users; the discrimination among different signals intended for different users is accomplished by exploiting a coding scheme, according to which different codes are assigned to different users, and the signals directed thereto are coded using the respective codes. The codes assigned to different users and exploited for coding the signals directed thereto need to be "orthogonal". The coding process comprises a so-called "spreading" operation, according to which the bandwidth of the original (uncoded) signal is widened, in particular spread over a larger bandwidth, at the same time reducing the average signal power. The spreading is achieved by coding the signal using a code that contains a higher number of symbols than the number of bits to be transmitted; the coded signal thus has a symbol rate (the so-called "chip rate") higher than the bit rate of the original signal.

A "scrambling" process is further implemented, by applying a "scrambling code" to the signal after the spreading operation, with the purpose of scrambling the different symbols. The scrambling operation does not increase the signal bandwidth (the symbol rate is not changed compared to the chip rate of the spread signal), and can be viewed as the addition of a "color" to the signal, that allows identifying the transmission source. Particularly, in downlink (i.e., from the radio base station to the mobile terminal), the scrambling process allows distinguishing the signals within a given network cell from the signal within a different cell: to this purpose, different scrambling codes are used in different cells, in particular if such cells are neighboring.

The adoption of the CDMA access scheme has an impact on the "handover" procedures, by which, generally speaking, there is intended the set of procedures that makes it possible to keep active a service provided to a generic mobile user even when the user moves. In particular, in the CDMA access scheme a mobile user may exploit a same radio channel in different cells; thus, the passage of responsibility (handover) of a given mobile user from one network cell to another adjacent thereto (typically, in consequence of the movement of the mobile user through the geographic area) can be handled by keeping the communication with the user active on the same channel. In particular, thanks to the fact that the signals issued from different sources (different antennas corresponding to different cells) are distinguishable because of the use of different scrambling codes, a mechanism referred to as "soft-handover" (relying on a particular type of receiver in the User Equipment—UE—, called "Rake") allows the mobile user's terminal to decode signals coming from, and thus to exchange information with, two or more different antennas or, more generally, with different radio base stations. In particular, thanks to this "soft-handover" mechanism, the UE can distinguish between signals issued by different cell radio base stations by looking at the different signal color. This takes place in particular areas, referred to as "soft-handover areas" or "macrodiversity areas". The different network cells to which the UE is simultaneously connected form the so-called "active set".

As known, in the UMTS the set of scrambling codes used in downlink is represented by the Gold codes featuring low self-correlation and cross-correlation. The length of the Gold code for the UMTS system is in principle equal to eighteen bits, for a total of $2^{18}-1=262,143$ different codes. However, in order to keep the receiver not too complex, only a fraction of such a vast set of codes is effectively exploited in practical implementations. Specifically, the standard prescribes that the number of usable codes in UMTS networks is limited to a pool of 8,192 different codes. The pool of 8,192 usable scrambling codes is subdivided into 512 groups, each group including 16 codes, where one of the sixteen codes takes the role of a so-called "primary scrambling code", and the remaining 15 codes of the group are "secondary scrambling codes".

When planning an UMTS network, or a particular regional area thereof, a unique primary scrambling code (and, consequently, the associated 15 secondary scrambling codes associated to that primary scrambling code), chosen among the available 512 primary scrambling codes, has to be assigned to each cell of the area under planning.

The pool of 8,192 scrambling codes available for use is further considered as subdivided into 64 code groups of 128 codes each, where, within the generic code group, eight codes among the 128 codes are primary scrambling codes; thus, the pool of 8,192 available scrambling codes includes 64 code groups, each one including eight primary scrambling codes (and associated secondary scrambling codes).

In downlink the primary scrambling code plays a role in the procedure called "cell search", which includes the set of operations that allow the UE synchronize to the network and decode the control channels of the network cell wherein it is located. Specifically, the UE invokes the cell search procedure in either one of two cases:

whenever the UE is turned on and has to register to the network for the first time (after a previous de-registration in consequence to a turn off); or for purposes of measuring the common channels of the adjacent cells, with the aim of updating the so-called "active set" of different network cells to which the mobile terminal is connected (a procedure called "cell reselection").

The cell search procedure impacts the UE performance: depending on the complexity of the operations to be performed, the UE battery charge consumption, as well as the time required by the UE for synchronizing and decoding the control channel (the so-called "Broadcast Control Channel"—BCH) over which the network information travels vary. In particular, the cell search procedure impact on the battery charge consumption is higher when the procedure is performed in support of the cell reselection procedure, because such operation is carried out more frequently compared to the initial synchronization of the UE upon turning it on.

The assignment of scrambling codes in downlink can be effected by means of planning algorithms, such as the one described in Y. H. Jung and Y. H. Lee, "Scrambling code planning for 3GPP W-CDMA systems", IEEE VTC2001 Spring, Rhodes, Greece, May 2001.

In particular, the scrambling code assignment has to satisfy a primary scrambling code re-use requirement, according to which unique primary scrambling codes, within the set of 512 available primary scrambling codes, have to be univocally assigned to neighboring cells belonging to the geographic area being planned. In particular, two generic cells are considered neighboring cells if at least one pixel of a cell "touches" a pixel of the other cell (geometrical neighborhood), or, according to a different criterion, if there exist portions of a cell wherein the power level of a predetermined channel, particularly the CPICH (RSCP) pilot channel of the other cell exceeds a predetermined threshold (electromagnetic neighborhood).

As it can be derived from the discussion made in S. Kourtis, "Code Planning Strategy for UMTS-FDD networks", in Proceedings of VTC 2000, Tokio, Spring 2000, the distance between primary scrambling codes assigned to neighboring network cells impacts the performance of the UE, directly affecting the computational cost of the cell search procedure, and the synchronization time of the UE, at the frame level. In particular, with the increase of the number of scrambling codes groups assigned to adjacent cells, within the pool of 512 scrambling codes, the time needed for achieving synchronization rises, whereas the computational complexity is reduced. On the contrary, with the decrease of the number of scrambling codes groups assigned to adjacent cells, within the pool of 512 primary scrambling codes, the time needed for achieving synchronization decreases, but the computational complexity increases.

The choice of which strategy to adopt is not univocal, and depends on the considered scenario. According to Kourtis, in a case of a micro-cell network (i.e., a network having cells of limited area coverage), typical of a urban environment, it is important to minimize the time required by the cell search procedure, particularly if the UEs exhibit a medium/high mobility: a poor synchronization performance means that the number of measurements taken by the UE per measuring period is small, thus the UE may not have the necessary information required to perform the soft-handover efficiently.

In the case of a macro-cell network (with network cells of relatively wide area coverage), more typical of sub-urban and rural environments, the greater cells' dimension allows tolerating higher delays in the cell reselection procedure. Then, it is preferable to privilege strategies that minimize the computational cost of the mobile terminal, thus increasing the battery charge life, also in view of the fact that, on average, the transmitted power of the terminals is higher in macro-cell environments than in micro-cell ones.

Kourtis provides guidelines for planning the primary scrambling codes in downlink; in particular, the guidelines are given providing some primary scrambling codes planning configurations which are to be preferred, and which are expressed in terms of the number (M) of different code groups among which the primary scrambling codes to be assigned to neighboring network cells are chosen, and the number (L) of primary scrambling codes within each code group.

SUMMARY OF THE INVENTION

The Applicant has observed that the approach outlined by Jung and Lee finds a limitation in the fact that the scrambling codes assignment strategy does not take in consideration the cell's typology.

As it can be derived by the discussion made by Kourtis, given two neighboring cells in the set of cells being planned, where by neighborhood there is intended either geometrical or electromagnetic neighborhood, or both, and provided that the primary code re-use requirement is satisfied, the assignment of the scrambling codes may nevertheless lead to substantial differences in the mobile terminals' performance, in dependence of the distance between the codes assigned to the two cells and of the cells' typology.

On the other hand, the Applicant observes that the guidelines set forth by Kourtis cannot be applied in general, because in some cases, such as for example in the case of the UMTS standard, the number (L) of primary scrambling codes within each code group is not variable, rather fixed and equal to 8. Moreover, in a real UMTS network the size of the set of cells monitored by the mobile terminal during the measurement operations carried out for the cell reselection procedure cannot be defined a priori, and thus the lower limit (equal to 12) set by Kourtis does not apply.

In view of the outlined state of the art and related problems, drawbacks and limitations, the Applicant has tackled the problem of how to perform scrambling code planning, i.e. how to assign scrambling codes, in downlink, to the cells of a CDMA-based mobile communications network, particularly a UMTS network, in a way that takes into account the network's cell typology and the peculiarities of the primary scrambling codes in the UMTS system, so as to substantially improve the UEs' performance trading off between battery charge consumption and synchronization speed.

According to an aspect of the present invention, there is provided a method of assigning scrambling codes to cells of a CDMA cellular mobile communications network as set forth below. The method comprises assigning to each cell of a set of cells of a network area a cell attribute identifying a cell typology; and assigning to each cell of said set of cells a respective primary scrambling code according to said cell attribute.

In particular, for each cell, a set of neighboring cells is defined, according to a predetermined neighborhood criterion, which may for example include a geometrical neighborhood criterion, or an electro-magnetic neighborhood criterion.

In an embodiment of the present invention, said cell attribute comprises a first attribute value adapted to identify a cell in which a complexity of computation to be performed by the user equipment for determining the cell primary scrambling code is to be minimized, and a second attribute value adapted to identify a cell in which a synchronization time of a mobile communications user equipment is to be minimized.

In an embodiment of the present invention, if the cell has an, attribute value equal to said first attribute value, the method comprises assigning to the cell a primary scrambling code different from the primary scrambling codes assigned to the neighboring cells.

In an embodiment of the present invention, if the cell has an attribute value equal to said second attribute, the method comprises assigning to the cell a primary scrambling code belonging to a code group different from the code groups to which the primary scrambling codes assigned to the neighboring cells belong.

The method may further comprises assigning to the cell a primary scrambling code different from the primary scrambling codes assigned to the neighboring cells in case a primary scrambling code belonging to a code group different from the code groups to which the primary scrambling codes assigned to the neighboring cells belong cannot be found.

Another aspect of the present invention concerns a method of planning a CDMA cellular mobile communications network, comprising a method of assigning scrambling codes to cells of a CDMA cellular mobile communications network as defined above.

The method can be implemented in software, and be implemented by a data processing apparatus. Thus, still other aspects of the present invention concerns a computer program directly loadable into a working memory of a data processing system and adapted to implement, when executed, the method defined above, and a computer program product comprising, stored on a computer readable media, the said computer program.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
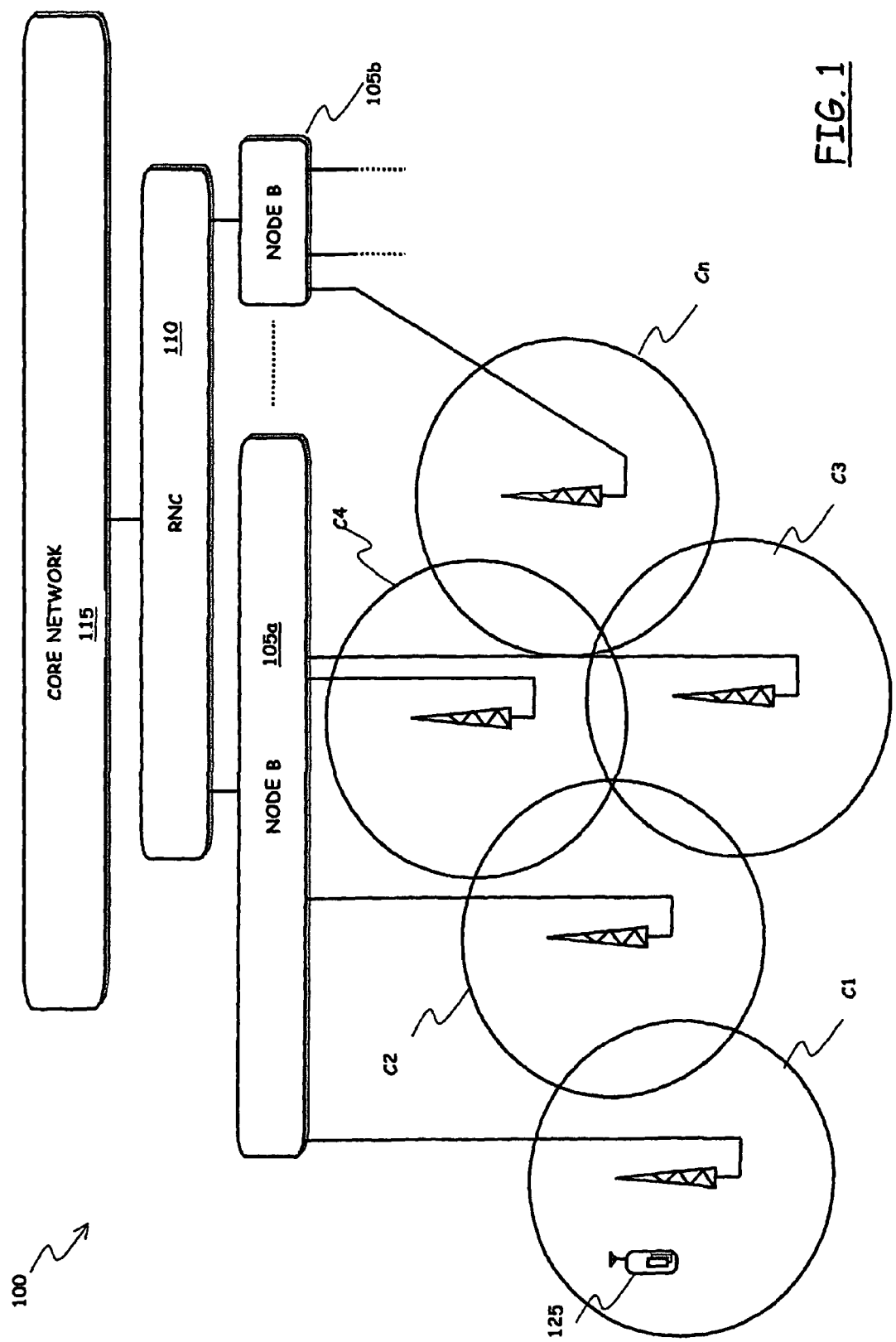
FIG. 1 pictorially shows a portion of a UMTS network being planned, intended to cover a respective geographic area, with a plurality of network cells to which scrambling codes are to be assigned during the planning process.

Referring to the drawings, in FIG. 1 there is schematically depicted a portion of UMTS network under planning, particularly an UMTS network portion intended to provide cellular mobile communications capability within a given geographic area.

The UMTS network portion under consideration, identified globally by reference numeral 100, comprises a plurality of cells C1, C2, C3, C4, . . . , Cn, each one having a relatively limited area coverage (the area coverage of the generic cell depending on several factors such as, for example, the environment wherein the UMTS network is installed, as will be described in greater detail later on). The cells are each one made up of a plurality of pixels, i.e., they are the set of geographic points covered and served by the radio electromagnetic signal irradiated by a respective cell's antenna.

Usually, groups of three to six cells (on average) are managed by a network entity called "Node B", such as the Node Bs 105a and 105b in the drawing (where, merely by way of example, it is assumed that the cells C1, C2, C3, and C4, are managed by the Node B 105a, and that the cell Cn is managed by the Node B 105b).

Groups of Node Bs are managed by a Radio Network Controller (RNC), like the RNC 110 shown in the drawing; the RNCs are connected to the core UMTS network 115.

In the drawing, the cells C1, C2, C3, C4, . . . , Cn are depicted as partially overlapping, in order to schematize a concept of "cell neighborhood". Neighborhood can be defined adopting different criteria: for example, as mentioned in the foregoing, two generic cells may be considered to be neighboring if at least one pixel of a one cell "touches" a pixel of another cell (geometrical neighborhood); alternatively, two generic cells may be considered to be neighboring if portions of a cell exist wherein the power level of a predetermined communications channel, for example the Control PIlot CHannel CPICH (RSCP) pilot channel of another cell exceeds a predetermined threshold (electromagnetic neighborhood).

A generic UE, like the UE 125 depicted as located within the cell C1, can thus receive signals transmitted by the antennas of different cells, and is able to differentiate among them.

Figure 3:
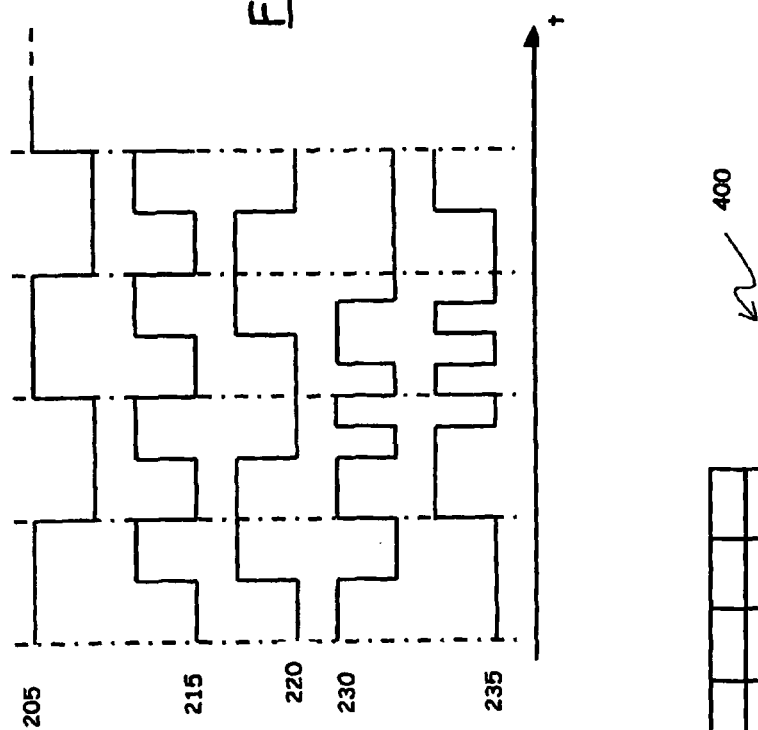
FIG. 3 schematically shows, in terms of a timing diagram, the result of the operations of spreading and scrambling on a signal to be transmitted.
Figure 2:
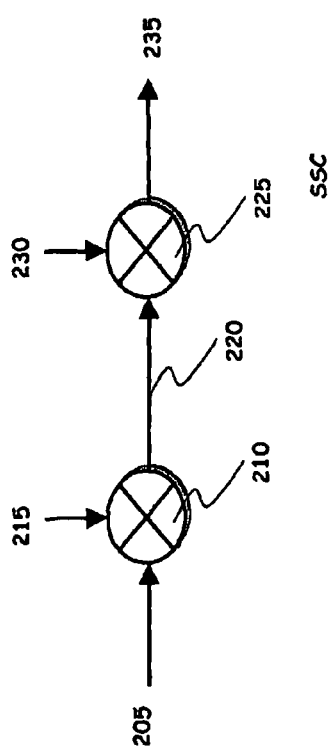
FIG. 2 schematically represents a spreading and scrambling operations performed on a signal to be transmitted, according to the UMTS standard.

This differentiation of signals coming from different transmitters is made possible by the adoption of the CDMA access technique. Making reference to FIGS. 2 and 3, each transmitter (particularly, the transmitter of the generic network cell) implements a spreading and a subsequent scrambling of the signal to be transmitted. The signal (data) to be transmitted 205, having a given symbol rate (usually called the bit rate) is first submitted to a spreading process 210, using a spreading code 215, in order to "widen" its spectrum and distribute (and thus lower) its power over the whole channel bandwidth. The spreading code 215 has a higher number of symbols than the signal to be transmitted 205, thus the spread signal 220 has a symbol rate (a chip rate, in jargon) higher than the bit rate of the initial signal 205.

The spread signal is then submitted to a scrambling process 225, using a spreading code or scrambling sequence 230. The signal scrambling process does not change the chip rate, thus the signal 235 to be transmitted "over-the-air" has a chip rate equal to that of the spread signal.

The scrambling process is used for making signals transmitted by the transmitters of different cells distinguishable.

To this purpose, every cell has to use a unique scrambling code, and thus a problem of scrambling code assignment rises.

As mentioned in the foregoing, in the UMTS standard the set of scrambling codes used in downlink is represented by the Gold codes featuring low self-correlation and cross-correlation. The length of the Gold code for the UMTS system is equal to eighteen bits, thus, in principle a total of $2^{18}-1=262,143$ different codes would be available. However, in order to keep the receiver (particularly, the one on-board the UEs) not too complex, only a fraction of such a vast set of codes is effectively exploited. Specifically, the standard prescribes that the number of usable codes in UMTS networks is 8,192.

Figure 4:
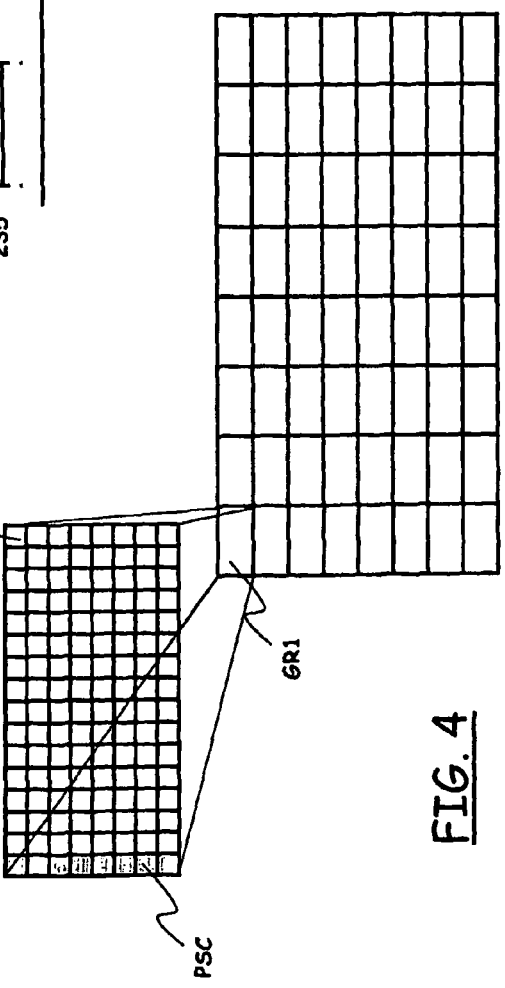
FIG. 4 pictorially shows a subdivision in groups of the scrambling codes, according to the UMTS standard.

Making reference to FIG. 4, the pool of 8,192 usable scrambling codes (identified globally by 400 in the drawing) is subdivided into 64 groups, like the group GR1 in the drawing, wherein each of said scrambling codes group, as depicted in the drawing, contains 128 different scrambling codes.

Within the 8,192 different scrambling codes, 512 of them are selected and adopted as "primary scrambling codes" PSC, whereas the remaining scrambling codes are "secondary scrambling codes" SSC. This simplifies the procedures of the search of the scrambling code and cell identification by the UE: in fact, some of the channels (for example, the Common Control Physical CHannel—CCPCH—and the Common PIlot CHannel—CPICH) always use the primary scrambling code, whereas other physical channels in downlink may either use the primary scrambling code or a secondary scrambling code.

By defining the 512 primary scrambling codes, the pool of 8,192 different scrambling codes can be viewed as subdivided into 512 sets of 16 scrambling codes each, where one of the sixteen scrambling codes is a primary scrambling code, the remaining 15 being secondary scrambling codes.

Therefore, referring again to FIG. 4, each group of 128 scrambling codes, like the group GR1, includes eight sets of 16 scrambling codes, and thus eight primary scrambling codes (those depicted as shaded squares), with the associated secondary scrambling codes.

The geographic area represented schematically in FIG. 1 is assumed to be an area of the UMTS network to be planned. Planning the network area means, among other issues, assigning (primary) scrambling codes to the different cells of the area under planning.

Figure 5:
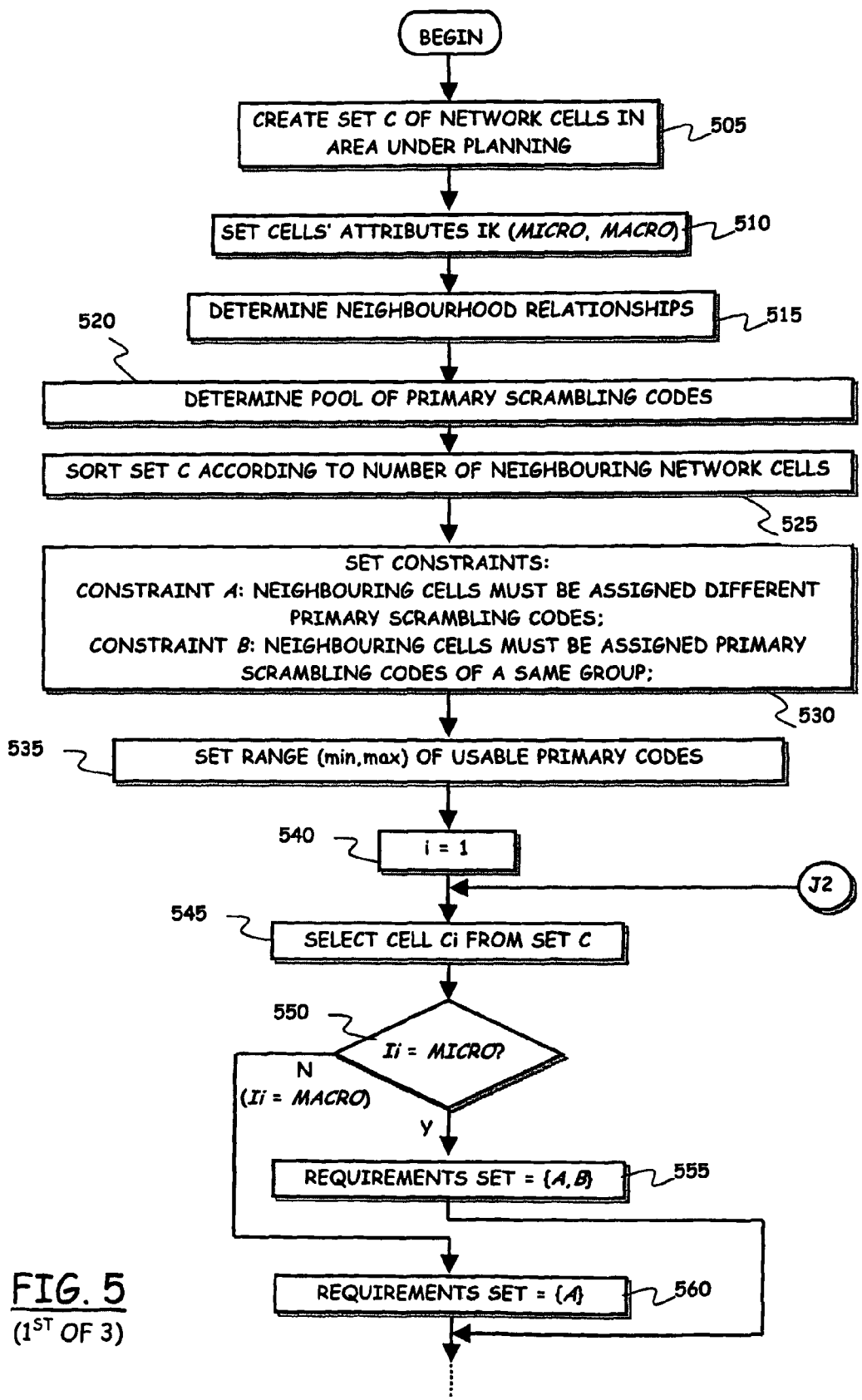
FIG. 5 is a schematic flowchart showing the main steps of a scrambling codes assignment method according to an embodiment of the present invention, for assigning scrambling codes to the cells of the network area being planned.
Figure 5:
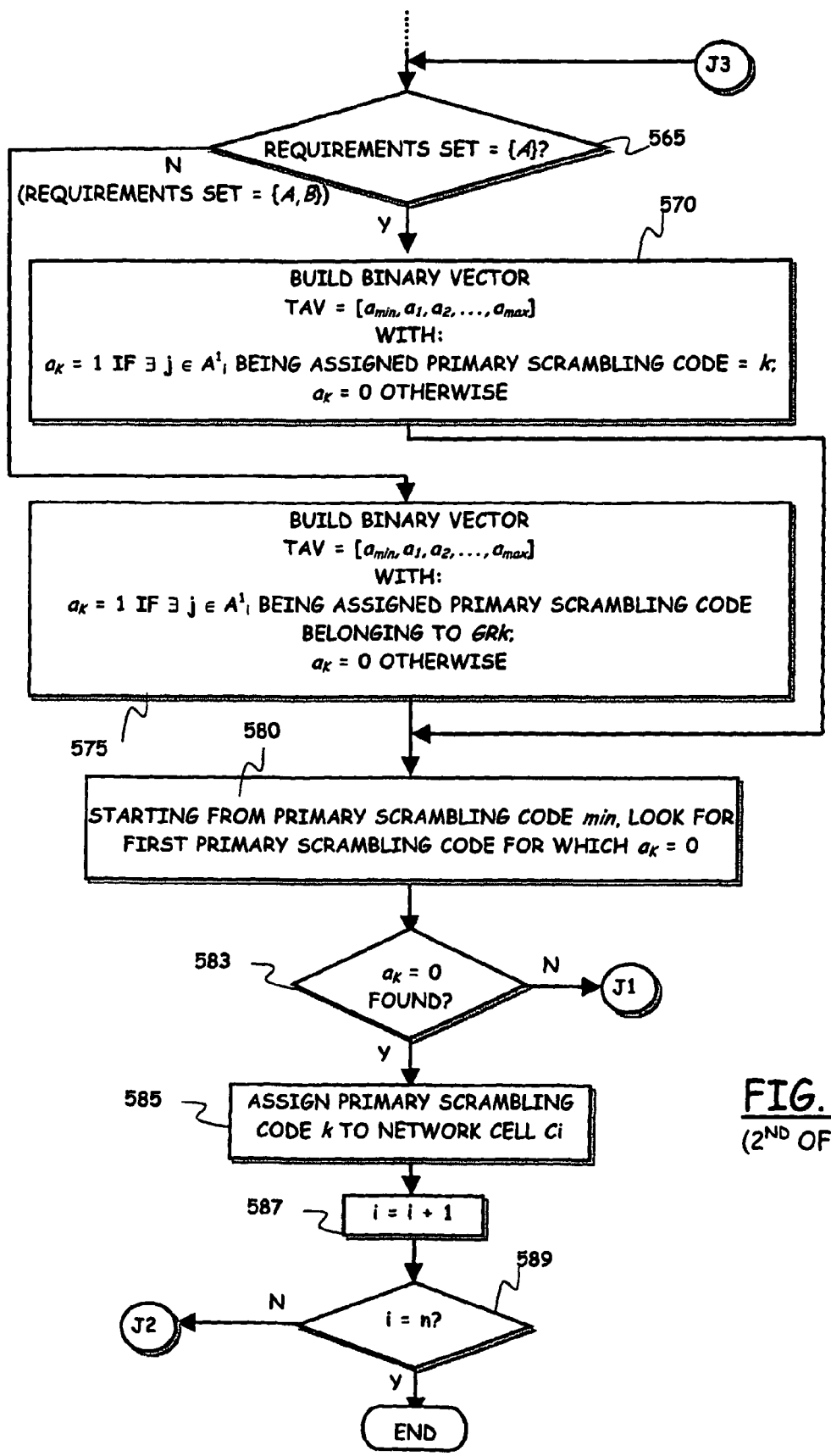
Figure 5:
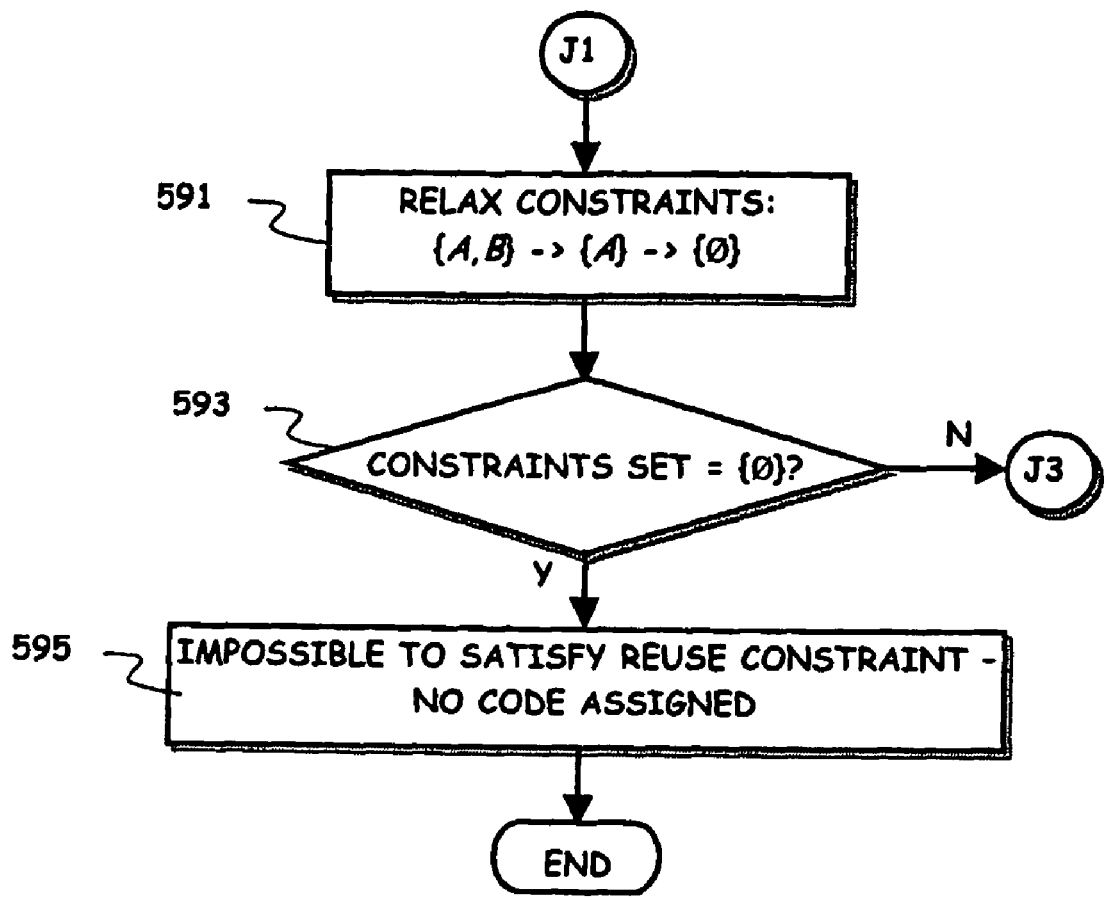

In the following, a method according to an embodiment of the present invention is described, adapted to be used in the UMTS network planning process, for assigning the scrambling codes to the different network cells of the area under planning. Reference will be made to the schematic flowchart of FIG. 5.

Firstly, a set $$C=\{C1, C2, \ldots, Cn\},$$ with n denoting a positive integer is created, where C indicates the set of n cells $C1, C2, \ldots, Cn$ belonging to the network area being planned, and to which it is necessary to assign the respective primary scrambling code (block 505). The number n of cells, and their nature, particularly their area coverage, is assumed to have been defined in advance, according to criteria such as the traffic load to be managed, the traffic geographical distribution, the network accessibility target (e.g., indoor, outdoor, "in car", . . . ), the traffic mobility (e.g. the average speed of the users), the area targets to be served, etc.

Then, attributes are assigned to each cell in the set C (block 510). To this purpose, let $$I=\{I1, I2, \ldots, In\}$$

denote a set of cell indicators $I1, I2, \ldots, In$, each cell indicator being related to a respective cell $C1, C2, \ldots Cn$; according to an embodiment of the present invention, the generic cell indicator $Ik$ can take one of two possible "values": a value MACRO and a value MICRO. Specifically, the generic indicator $Ik$ takes the value MACRO in case the typology of the respective cell $Ck$ is such that the assignment of the scrambling code to the respective cell $Ck$ has to be carried out minimizing the computational complexity required to the generic UE, even if this penalizes the synchronization speed. On the contrary, the cell indicator $Ik$ takes the value MICRO in case the cell's typology is such that the assignment of the scrambling code to the respective cell $Ck$ has to be carried out minimizing synchronization time, penalizing the computational complexity required to the generic mobile terminal. For example, a generic network cell is characterized by a MICRO attribute in case it belongs to a micro-cellular network environment, such as in dense, urban environments; differently, a network cell is characterized by an attribute MACRO in case it belongs to a macro-cellular environment, like in a suburban/rural environment.

Moreover, for the generic cell $Ck$ of the set C, a set $A^1k$ of neighboring cells is defined (block 515), where any other cell of the set C is considered neighboring to the cell $Ck$ based on a predetermined neighborhood criterion, for example the geometrical neighborhood criterion or the electromagnetic neighborhood criterion defined in the foregoing (it is however pointed out that different neighboring criteria can be adopted).

Thus, the set C of cells can be conveniently represented as:

$$C=\{C1(I1, A^11), C2(I2, A^12), \ldots, Cn(In, A^1n)\}.$$

Moreover (block 520), the pool P of m primary scrambling codes PSC1, PSC2, . . . , PSCm available for use in the area under planning is defined:

$$P=\{PSC1, PSC2, \ldots PSCm\},$$

subdivided in groups as depicted in FIG. 4, where the pool P may include all the available 512 primary scrambling codes within the total of 8,192 scrambling code, or only a subset thereof.

According to an embodiment of the present invention, the set C of cells in the area under planning is then sorted by considering the number of neighboring cells of the generic cell, as indicated by the cardinality of the sets $A^11, A^12, \ldots, A^1n$ (block 525). This means that, in the subsequent steps of the method, the cells having a higher number of neighbors are processed first.

Than, constrains to be respected in the primary scrambling code assignment procedure are set (block 530). In particular, according to an embodiment of the present invention, two constraints are set:

a first constraint (CONSTRAINT A) preventing the assignment of same primary scrambling codes to neighboring cells (this constraint correspond to the main, primary scrambling code re-use constraint);

a second constraint (CONSTRAINT B) according to which primary scrambling codes belonging to a same group (like the group GR1 in FIG. 4) of scrambling codes are to be assigned to neighboring cells.

According to an embodiment of the present invention, the second constraint (CONSTRAINT B) is susceptible of being relaxed (to the less stringent first constraint CONSTRAINT A) in case it is of prejudice to the possibility of assigning the primary scrambling codes to the cells; differently, the first constraint, corresponding to the above-mentioned primary scrambling code re-use constraint, is a mandatory requirement and can in no case be relaxed.

A range [min, max] of usable primary scrambling codes is then defined (block 535), within the pool of primary scrambling code (possibly, all the 512 scrambling codes).

A repetitive procedure is then performed: a loop counter i is initialized to "1" (block 540), and the first cell in the (sorted) set C is selected for being processed (block 545).

For the selected cell $Ci$, the set of requirements to be respected in the primary scrambling code assignment procedure is initialized. In particular, it is first ascertained whether the attribute $Ii$ for the selected $Ci$ is MICRO (decision block 550). In the affirmative case (exit branch Y of decision block 550), meaning that the cell Ci has a limited area coverage, as is typical of, e.g. dense, urban environments, or in general any micro-cellular environment, the set of requirements is initialized to {A,B} (block 555), i.e., the primary scrambling code assignment procedure will try to assign to neighboring cells primary scrambling codes of the same group. If instead it is ascertained that the attribute Ii for the selected cell Ci is MACRO (exit branch N of decision block 550), meaning that the cell has a relatively wide area coverage, as is typical of, e.g. sub-urban or rural environments, or in general any macro-cellular environment, the set of requirements is initialized to {A} (block 560), i.e., the primary scrambling code assignment procedure will respect only the primary scrambling code re-use constraint, avoiding to assign a same primary scrambling code to neighboring cells.

Then, for the selected cell Ci a binary vector $$TAVi=[a_{min},a_1,a_2,\ldots,a_{max}], \text{ with } a_k=0 \text{ or } 1$$

is built, depending on the set of requirements. In particular, if it is ascertained that the set of requirements is {A} (exit branch Y of decision block 565), the binary vector TAVi is such that (block 570):

$a_k=1$ if there exist a neighboring cell of the selected cell Ci (i.e., a cell belonging to the set $A^1i$) to which the primary scrambling code $PSC_k$ has been assigned; whereas $a_k=0$ otherwise.

If instead it is ascertained that, for the selected cell Ci, the set of requirements is {A,B} (exit branch N of decision block 565), the binary vector TAVi is built in such a way that (block 575):

$a_k=1$ if there exist a neighboring cell of the selected cell Ci (i.e., a cell belonging to the set $A^1i$) to which a primary scrambling code belonging to the group GRk of primary scrambling codes including the code $PSC_k$ has been assigned; whereas $a_k=0$ otherwise.

After having built the proper binary vector TAVi, the vector is scanned, starting from the vector component $a_{min}$ that corresponds to the lower primary scrambling code in the usable range [min,max], in search of the first encountered binary vector component $a_k$ that is equal to "0" (block 580).

When such a component $a_k$="0" is encountered (exit branch Y of decision block 583), the corresponding primary scrambling code $PSC_k$ (together with the associated set of 15 secondary scrambling codes) is assigned to the cell Ci (block 585).

The loop counter i is increased by one (block 587), and the operation flow jumps back to block 545 (connector J2); a new cell Ci is selected and processed in the way described above, unless all the cells of the set C have already been processed (decision block 589), in which case the procedure ends.

If on the contrary no component $a_k$="0" is found (exit branch N of decision block 583), the constraints for the primary scrambling code assignment-procedure are relaxed (block 591). In particular, relaxing the constraints means that if the current constraints set is {A,B}, the constraint B is eliminated, and the constraints set is declassed to {A}; if instead the current constraints set is {A}, it is declassed to the void set {Ø}.

Then, the operation flow jumps back to block 565 (connector J1), unless it is ascertained that the updated constraints set is the void set (decision block 593), in which case it is decreed that the assignment of scrambling code to the cell Ci is impossible because the basic re-use constraint cannot be satisfied (block 595). The procedure then ends.

For example, if the constraint is relaxed from {A,B} to (A) (which happens if a primary scrambling code belonging to a code group different from the code groups to which the primary scrambling codes assigned to the neighboring cells belong cannot be found), the algorithm assigns to the cell a primary scrambling code different from the primary scrambling codes assigned to the neighboring cells, independently from the code group.

At the end of the procedure, a respective primary scrambling code (and the associated secondary scrambling codes) is assigned to each cell in the area under planning, unless the procedure ended for impossibility of assigning the scrambling codes satisfying the re-use requirement.

In case of impossibility of assigning to one or more cells the scrambling codes satisfying the re-use requirement, the algorithm may assign to these cells a particular code external to the set of codes previously considered.

Thanks to the present invention, a particular embodiment of which has been presented in the foregoing, it is possible to allocate primary scrambling codes (in downlink) to the network cells taking into account constraints related to the kind of environment to which the generic cell belong (e.g., a micro-cellular environment or a macro-cellular environment), and to optimize the scrambling code assignment, optimizing the trade-off between the minimization of the synchronization times necessary to the terminal in urban/dense urban environments and/or micro-cellular (cells qualified as MICRO), and the minimization of the computation complexity posed on the terminal in suburban/rural and/or macro-cellular environments (cells qualified as MACRO).

The method according to the present invention can be implemented by way of a program executed by a suitable data processing apparatus, such as a personal computer or a workstation.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method of assigning scrambling codes to cells of a CDMA cellular mobile communications network implemented by a data processing apparatus, the method comprising:
    assigning, by the data processing apparatus, to each cell of a set of cells of a network area, a cell attribute identifying a cell typology; and
    assigning, by the data processing apparatus, to each cell of said set of cells a respective primary scrambling code according to said cell attribute,
    wherein said cell attribute comprises a first attribute value configured to identify a cell in which a complexity of computation to be performed by user equipment for determining the cell primary scrambling code is to be minimized, and a second attribute value configured to identify a cell in which a synchronization time of mobile communications user equipment is to be minimized.

2. The method according to claim 1, further comprising:
    defining a set of neighboring cells according to a predetermined neighborhood criterion for each cell.

3. The method according to claim 2, wherein said neighborhood criterion comprises a geometrical neighborhood criterion.

4. The method according to claim 2, wherein said neighborhood criterion comprises an electro-magnetic neighborhood criterion.

5. The method according to claim 2, wherein assigning to each cell of said set of cells a respective primary scrambling code comprises:
  if the cell has an attribute value equal to said first attribute value, assigning to the cell a primary scrambling code different from the primary scrambling codes assigned to the neighboring cells.

6. The method according to claim 2, wherein assigning to each cell of said set of cells a respective primary scrambling code comprises:
  if the cell has an attribute value equal to said second attribute, assigning to the cell a primary scrambling code belonging to a code group different from the code groups to which the primary scrambling codes assigned to the neighboring cells belong.

7. The method according to claim 6, further comprising:
  in case a primary scrambling code belonging to a code group different from the code groups to which the primary scrambling codes assigned to the neighboring cells belong cannot be found, assigning to the cell a primary scrambling code different from the primary scrambling codes assigned to the neighboring cells.

8. A method of planning a CDMA cellular mobile communications network implemented by a data processing apparatus, comprising a method of assigning scrambling codes to cells of a CDMA cellular mobile communications network according to claim 1.

9. A non-transitory computer readable storage medium encoded with a computer program directly loadable into a working memory of a data processing system capable of being configured to implement, when the computer program is executed, the method according to claim 1.

* * * * *